United States Patent [19]

Moherek

[11] 4,300,725
[45] Nov. 17, 1981

[54] APPARATUS FOR UNIFORMLY DISPENSING AND DISTRIBUTING MATERIAL

[76] Inventor: Edward F. Moherek, P.O. Box 157, Macungie, Pa. 18062

[21] Appl. No.: 196,625

[22] Filed: Oct. 14, 1980

Related U.S. Application Data

[63] Continuation of Ser. No. 74,913, Sep. 13, 1979, abandoned.

[51] Int. Cl.³ .............................................. A01C 17/00
[52] U.S. Cl. .................................. 239/684; 141/392; 222/168; 222/410; 239/687; 414/301
[58] Field of Search ............... 222/167, 168, 410, 411; 239/665, 666, 684, 687; 414/301; 141/286, 392

[56] References Cited

U.S. PATENT DOCUMENTS

| | | | |
|---|---|---|---|
| 1,166,476 | 1/1916 | Parrish | 239/665 |
| 3,036,745 | 5/1962 | Johnson | 222/411 |
| 3,064,833 | 11/1962 | Von Ruden | 239/684 X |
| 3,279,655 | 10/1966 | Isserlis | 222/168 |
| 4,162,960 | 7/1979 | Dhondt | 414/301 X |

Primary Examiner—Robert J. Spar
Assistant Examiner—Fred A. Silverberg

[57] ABSTRACT

An apparatus for the uniform, controlled distribution of free flowing material comprising a rotatable, vertically-oriented, hollow delivery tube mounted for rotation about a vertical axis within a fixed housing and driven by means of a motor external of said tube. At its upper end, the tube has an inlet port for receiving material and carrying it for distribution from its lower end by an integral system which includes apertures located in the tube walls, and a deflection member at the base of said tube for impelling the material out of the tube through the said apertures. The lower end of said tube protrudes from and is restrained by said housing.

1 Claim, 2 Drawing Figures

APPARATUS FOR UNIFORMLY DISPENSING AND DISTRIBUTING MATERIAL

CROSS REFERENCE

This application is a continuation of U.S. application Ser. No. 06/074,913, filed on Sept. 13, 1979, now abandoned.

BACKGROUND AND SUMMARY OF THE INVENTION

The necessity and utility of devices for conveying and uniformly dispensing materials for processing or packaging is widely recognized and numerous devices exist or have been proposed to accomplish these tasks. One class of devices employs rotating tubes or impellers, and combinations thereof, to distribute free flowing materials. Although these devices are capable of accomplishing the specific tasks for which they are designed, they suffer from several disadvantages which the present invention is designed to overcome.

The present invention relates to a device for delivering, dispensing and distributing free-flowing materials, by gravity and centrifugal force, within a closed container such as a silo or a railroad car. More particularly, the apparatus described herein is adapted to convey and uniformly distribute a wide variety of granular or pulverized materials, at a controlled rate, by means of a delivery system of simplified, integral design, which is insertable in a variety of physical locations. The distribution of the materials is accomplished by a unique "spin filling" mechanism. This apparatus for accomplishing this task is comprised of a elongated, hollow delivery tube mounted within a housing for rotation about its vertical axis. The delivery tube has a port for receiving materials from above and apertures in its walls at its base, thereby permitting the movement of free-flowing materials through the tube and to the container. Additionally, the delivery tube and housing include two significant features which contribute to its uniqueness: first, the drive means for rotating the delivery tube is located to the exterior of the tube and is integral therewith; hence, the flow path is unencumbered by any drive shafts and permits an enlarged cross section with no internal obstructions. Second, integral with the base and adjacent to apertures in the walls of said delivery tube, there is a horizontal receiving platform having vertically-oriented impeller blades, spaced with respect to the axis of rotation, for deflecting the material from its downward path and out through said apertures. Impeller blades, per se, are not new, but since the platform and impeller blades thereon are integral with the tube and adjacent to said apertures, no additional internal drive means is necessary for rotating the platform and impellers along with the delivery tube about a central vertical axis. In a variation of the design; a second closure tube, internal of the rotating conveying tube, can be raised and lowered to vary the size of the apertures at the base of the rotating tube.

The combination of these features simplifies the design of the system and makes it less cumbersome. It also reduces the likelihood of clogging or breakdown, and facilitates the movement and insertion of the distributing tube or cylinder to and into a wide variety of relatively enclosed spaces.

DETAILED DESCRIPTION OF THE PREFERRED EMBODIMENT

Figure 1:
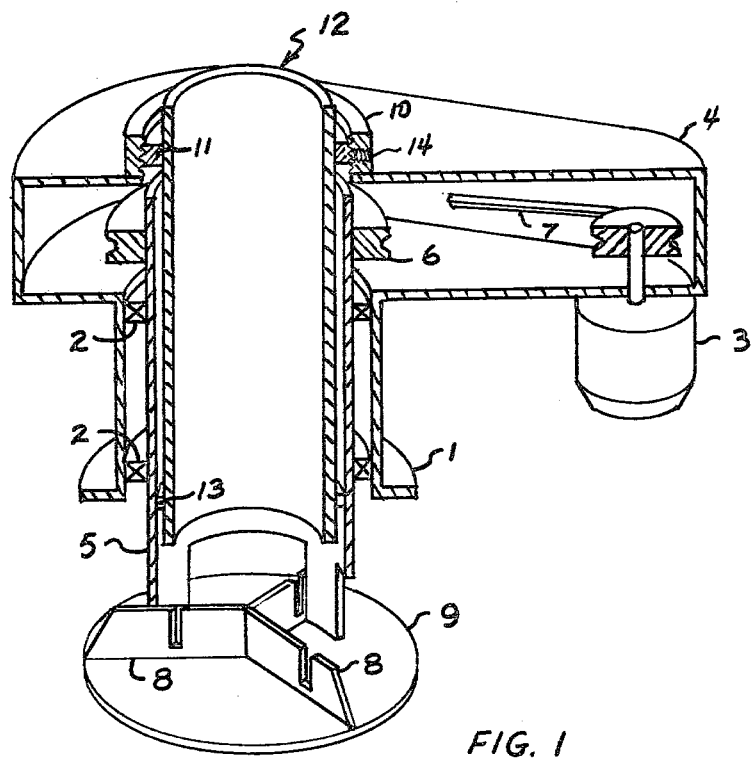
FIG. 1 is a longitudinal perspective view, in partial cross section, illustrating the mounting of the rotating delivery tube within the housing of the distribution apparatus, including the added feature of an adjustable aperture—closure tube adjacent to the interior of the rotatable tube.
Figure 2:
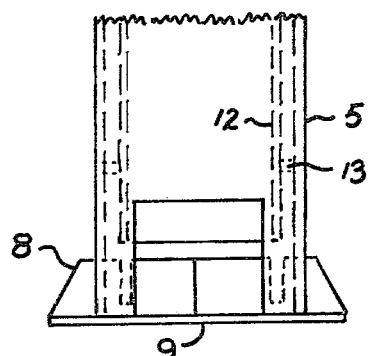
FIG. 2 is a detailed, vertical cross-sectional view of the lower portion of the distribution apparatus in which the relationship between the adjustable closure tube, the rotating delivery tube, and the integral platform having impeller blades thereon is illustrated in phantom lines.

Referring in detail to FIGS. 1 and 2 of the drawings, there is shown an apparatus which generally comprises a stationary, casing or housing (1) which holds, shields and supports the elements of the claimed apparatus. Interior of the vertical, cylindrical part of said housing are two bearings (2) which restrain a hollow, rotatable delivery tube (5) in such a manner to allow free rotation about the common axis of the cylindrical part of the housing (1) and the tube (5), but not allowing any vertical movement by said tube (5) within the housing (1).

Material to be distributed enters at the top of the tube (5) by feed means (not shown). The tube (5) rotated by drive means comprised, in this case, of a motor (3), exterior of said housing (1), and attached to a drive pulley (not numbered) and belt (7), which in turn communicate with a driven pulley (6). The driven pulley (6) is attached to the exterior of said delivery tube (5). The housing (1) is extended to form a shield (4) for the pulley drive system. Of course, the motor may be operated at fixed or variable rates to suit the needs of the system. The optimum motor speed will depend on the characteristics of the materials being carried, the dimensions of the system, including the apertures, and the distribution rate and spread desired.

At the base of said delivery tube (5) there is provided a deflector means comprised of a flat circular disc (9) having three vertical impeller blades (8) radiating from the center of the disc, which is located on the axis of rotation. The walls at the base of the tube also contain two or more apertures or openings which provide an exit for the material being distributed. As illustrated, the apertures (not numbered), blades (8) and disc (9) all form an integral unit which is rotated in conjunction with the tube (5). As material descends through the tube (5) it is flung out the apertures in the walls at the base of the tube with centrifugal force imparted by the rotating blades (8). Again, the number, size and shape of the apertures (not numbered) and the blades (8), and the shape and orientation of the disc (9) will be dictated by the requirements placed on the system.

Finally, there is shown in FIGS. 1 and 2 a hollow, adjustable, internal closure tube (12) positioned just inside the interior wall of the rotating tube (5) and mounted to the top of the annular casing (1) by a mounting ring (10), just above the level of the pulley shield (4). The adjustable closure tube (12) is held by an interior threaded cylindrical ring (11) having threads which mate with the external ring (10) in the upper portion of the housing (1). Towards the base of the closure tube (12) there is shown a low-friction cylindrical guide ring (13) which is attached to the exterior of the closure tube (12) and controls the annular positioning of the closure tube (12) with respect to the rotating tube (5). The hollow closure tube (12) can be moved up and down relative to the rotating tube (5) thereby varying the size of the apertures at the base of the rotating tube (5). The closure tube may be locked in place by a lock screw (14), thereby varying the size of the apertures at the base thereof. As the closure tube descends toward the blades (8) and disc (9), it can enter vertical slots or cut-out sections (not numbered, but illustrated) of said blades, thus effecting a closure of the apertures to any desired degree, including complete. The adjustable, internal closure tube (12) feature gives a far greater control of flow rate and spread characteristics and therefore, is an integral part of the preferred embodiment. Ideally, the apparatus will employ both variable speed and variable aperture mechanisms so that it may handle a wide variety of materials having different weight, size and flow characteristics.

The following claims and their obvious equivalents are believed to define the true scope of the invention.

I claim:

1. An apparatus for the delivery and distribution of free-flowing material by gravity and centrifugal force, which comprises: an elongated, vertical, hollow delivery tube rotatable about its vertical axis at variable, controlled speeds, said tube having in its upper portion an inlet for receiving said material and also having apertures in the walls at its base, thereby permitting the flow of said material therethrough; a distribution and deflection means, integral with said walls of the base of said delivery tube and rotating therewith which, in cooperation with said apertures, redirects the downward flow of material in said tube and impells it out through the apertures; a variable speed drive means external to said delivery tube for rotating said tube and said distribution and deflection means; a housing for enclosing and holding the upper portion of said delivery tube and said drive means, said housing comprising means for refraining the tube from vertical movement while allowing the tube to rotate about a fixed vertical axis; the lower portion of said delivery tube protrudes below said housing so that said material can flow through said apertures to the exterior thereof; wherein the drive means comprises a variable speed motor, said motor drives a first driven pulley, said first pulley is connected by a belt to a second pulley integral with the upper portion of said delivery tube to thereby rotate the delivery tube; wherein the distribution and deflection means comprises a relatively flat, circular disc integral with the walls of the delivery tube, said disc having mounted thereon vertically oriented and horizontally extending impeller blades for deflecting material through said apertures adjacent thereto, said blades extending from the interior of the tube through the apertures to the exterior of the tube, each of said blades having a vertical slot inside the tube; wherein the delivery tube further comprises a vertically sliding, adjustable closure tube located immediately adjacent to the interior wall of said delivery tube in annular relation therewith, said closure tube being moveable vertically; lock means integral with said housing and said closure tube for fixing the closure tube in a selected vertical position and thereby varying the sizes of the apertures in the walls of said delivery tube, the closure tube as it approaches its lower limit enters the slots in the blades to control the flow through said apertures with the flow being completely shut off when the closure tube reaches the lower limit.

* * * * *